No. 788,043.

Patented April 25, 1905.

UNITED STATES PATENT OFFICE.

FRANCIS X. GOVERS, OF OWEGO, NEW YORK.

PAPER-COATING.

SPECIFICATION forming part of Letters Patent No. 788,043, dated April 25, 1905.

Application filed September 6, 1904. Serial No. 223,461.

*To all whom it may concern:*

Be it known that I, FRANCIS X. GOVERS, a citizen of the United States, residing at Owego, in the county of Tioga and State of New York, have invented new and useful Improvements in Paper-Coatings, of which the following is a specification.

This invention relates to compositions especially adapted for use as paper-coatings, and has for its object to produce a new and improved composition for coating paper and for other uses.

My new composition in its preferred embodiment consists of casein, a wholly or partially saponified wax, preferably vegetable wax, an alkali and water, either with or without the addition of a suitable mineral base.

In the preparation of my composition I first wholly or partially saponify the wax which I desire to employ, preferably carnauba wax from *Corypha cerifera* (Linn) *Copernicia cerifera*, (Mart,) by heating the same with an alkali, preferably sodium hydrate, in the manner well known to chemists, using sufficient of the alkali to effect the partial or total saponification of the wax, as desired. I prefer to employ insufficient alkali to effect the complete saponification of the wax in order to produce what I term a "superwaxy" saponified wax, in which saponified product there is a material proportion, preferably from ten to twenty-five per cent., of free or uncombined wax. Such superwaxy saponified product when used with the other ingredients produces a paper-coating composition which is superior to any heretofore produced. To the wholly or partially saponified wax I add the casein, alkali, preferably sodium hydrate, water, and the mineral base when the latter is used.

The proportion of the several ingredients of my composition may be varied as desired, the following having been found to produce a coating of particular excellence: alkali, one part; saponified wax, twenty parts; casein, thirty parts; water, one hundred parts; mineral base, six hundred parts.

It is to be understood that my invention is not limited to the use of wholly or partially saponified wax prepared according to any particular method, but contemplates the use of any wholly or partially saponified wax from whatever source or however prepared. It is to be further understood that my invention is not limited to the use of the specific proportion stated nor to the employment of the specific ingredients mentioned, the employment of chemical equivalents of such ingredients being within my invention and within the scope of the protection defined by the appended claims.

Having thus described my invention, what I claim as novel, and desire to secure by Letters Patent, is—

1. A new composition comprising saponified wax and casein.

2. A new composition adapted for coating paper and the like, comprising superwaxy saponified wax and casein.

3. A new composition adapted for coating paper and the like, comprising saponified wax, casein, water and an alkali.

4. A new composition adapted for coating paper and the like comprising saponified wax containing uncombined wax, casein, water and an alkali.

5. A new composition adapted for coating paper and the like, containing approximately twenty parts of saponified wax, thirty parts of casein, one part of alkali one hundred parts water, and six hundred parts of a mineral base.

6. A new composition adapted for coating paper and the like, which comprises saponified vegetable wax, casein, water and an alkali.

7. A new composition adapted for coating paper and the like comprising saponified wax, casein and a mineral base.

8. A new composition adapted for coating paper comprising superwaxy saponified wax, casein and a mineral base.

9. A new composition adapted for coating paper and the like consisting of saponified vegetable wax, casein, water, an alkali and a mineral base, substantially as hereinbefore described.

In testimony whereof I affix my signature in presence of two subscribing witnesses.

FRANCIS X. GOVERS.

Witnesses:
KATHRYN LA MONTE,
M. B. MOORE.